(No Model.)
J. AUSTIN & R. CHAMBERLAIN.
GATE.
No. 299,451. Patented May 27, 1884.
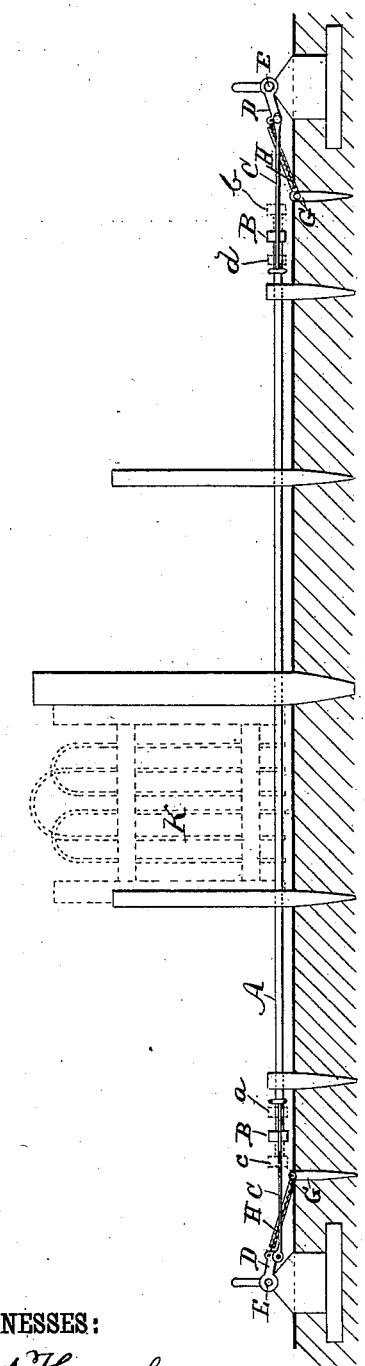
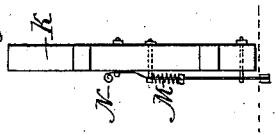
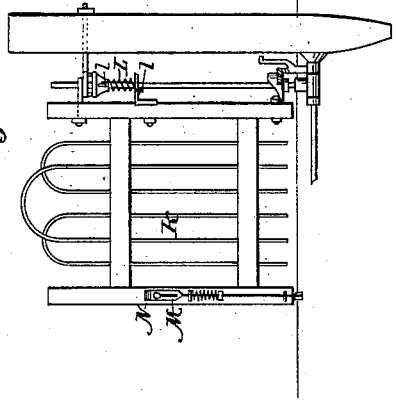
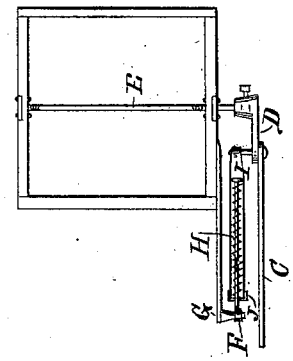
WITNESSES:
Thos. Houghton.
A. G. Lyne.
INVENTORS:
Josiah Austin
Rosco Chamberlain
BY Munn & Co.
ATTORNEYS.

UNITED STATES PATENT OFFICE.

JOSIAH AUSTIN AND ROSSCO CHAMBERLAIN, OF EAST LIBERTY, OHIO.

GATE.

SPECIFICATION forming part of Letters Patent No. 299,451, dated May 27, 1884.

Application filed June 15, 1883. (No model.)

*To all whom it may concern:*

Be it known that we, JOSIAH AUSTIN and ROSSCO CHAMBERLAIN, both of East Liberty, in the county of Logan and State of Ohio, have invented a new and useful Improvement in Gates, of which the following is a full, clear, and exact description, reference being had to the annexed drawings, forming part of this specification.

This invention relates to certain improvements in that form of automatic gates shown and described in our Letters Patent Nos. 251,498 and 272,619.

In the drawings, Figure 1 is a side elevation of our improved mechanism for operating the gates. Fig. 2 is a detail plan view, and Figs. 3 and 4 are detail views of one of the gates.

A indicates the sliding bar or rod for operating the gates on the principle described in the above-named patents. Near each end of this bar is secured a bearing-collar, B, with which a pull-rod, C, connected to an arm, D, on the crank-shaft E, is adapted to engage by means of a loop, to operate the said bar when the crank-shaft is turned in either direction by the wheel of a passing vehicle. The arm D at each end of the device is turned toward the gate at a position nearly or quite at right angles to the crank, in order that it shall exert a pulling effect on the rod C, whether turned upward or downward, according to the direction in which the crank is deflected. The bearings of the crank-shaft are to be located sufficiently above ground to allow the proper oscillation of the arm without the need of forming an excavation in the ground, in which water might accumulate and freeze, and thus obstruct the action of the gate. To cause the crank to return to its normal position after being deflected, we provide a rod, F, which is pivoted to a support, G, at one end, and connected at the other to a spiral spring, H, arranged around the same, and inclosed in a tubular case, I, which has a cap, J, for holding the spring therein while the rod slides through a perforation in the cap. The tubular case is connected to the arm D on the side opposite from the pull-rod C. The action of the spring is to be such that it will always draw the arm D toward the gate, in order to give the crank the necessary upright position.

The operation of the device will be as follows: A vehicle passing from the right to the left, referring to the drawings, will deflect the crank with which it comes in contact toward the gate, and thus deflect the arm D, connected to said crank, and draw the bar A to the position *a b*, shown in dotted lines. This action will open the gates by the means described in the above-named patents, while the open position of the gate, in which it is held by a catch, will hold the bar A in the position *a b*. As soon as the wheel or wheels have passed over the deflected crank, the latter will be returned to its normal position by the action of spring H, so that only the bar A will need to be operated to close the gate again. Now, as the vehicle passes on and comes in contact with the crank at the left hand of the drawings, this crank will be deflected from the gate, causing the arm D, connected to said crank, to rise, and, by means of its pull-rod, to draw the bar A to the position shown in full lines, whereby the gate is closed. The position *c d* of the bar A shown in dotted lines indicates the action of the device when a vehicle passes from left to right, which, of course, is just the reverse of that above described.

In the gate K, instead of using a simple spiral spring, L, for maintaining continual engagement between the toothed segments, by which the gate is swung around from one position to another, (see above-named patents,) we form the spring with straightened ends *l*, arranged in line with the vertical movement of the gate when actuated by the unlatching-cam, in order that a quicker movement may be secured by the action of the cam in lifting and thereby unlatching the gate. This quicker movement is secured by the fact that the straight ends of the spring, which are adapted to slide in holes in the brackets supporting the spring, prevent the latter from offering any resistance at the initial step of the lifting movement.

M indicates a spring-latch for the gate, consisting of a rod supported in guides on the gate, and having a spiral spring for securing the proper engagement of the catch with the keeper. The latch is provided with a handle, N, for the use of persons on foot.

What we claim is—

1. The combination, with the sliding bar having means for operating the gate, and provided with a collar near each end, of the two crank-shafts supported in bearings above the surface of the ground, and having each an arm, which is rigidly attached thereto and turned toward the gate, the pull-rods connected to the two arms, and having loops engaging with the collars on the ends of the sliding bar, and the returning-springs, substantially as shown and described, whereby either pull-rod shall be drawn in a direction from the gate, whether the crank-shaft to which it is connected be deflected toward or from the gate, and whereby the operation of one crank-shaft and pull-rod will leave the other unmoved.

2. The combination, with the sliding bar for operating the gate, of the crank-shafts having rigid arms turned toward the gate, the two pull-rods, one connecting each arm with the said bar, and the returning device consisting of the tubular case, sliding rod, and spring, arranged and adapted to operate substantially as shown and described.

JOSIAH AUSTIN.
ROSSCO CHAMBERLAIN.

Witnesses:
J. O. SWEET,
E. J. HOWENSTIEN.